United States Patent
Abi-Nassif et al.

(10) Patent No.: US 6,859,464 B2
(45) Date of Patent: Feb. 22, 2005

(54) METHOD AND DEVICE FOR CONTROLLING OUTLIERS IN OFFERED LOAD ESTIMATION IN A SHARED MEDIUM COMMUNICATION NETWORK

(75) Inventors: Firass Abi-Nassif, Brighton, MA (US); Whay Chiou Lee, Cambridge, MA (US)

(73) Assignee: Motorola, Inc., Schaumburg, IL (US)

(*) Notice: Subject to any disclaimer, the term of this patent is extended or adjusted under 35 U.S.C. 154(b) by 65 days.

(21) Appl. No.: 10/452,410

(22) Filed: Jun. 2, 2003

(65) Prior Publication Data

US 2003/0193903 A1 Oct. 16, 2003

Related U.S. Application Data

(63) Continuation of application No. 09/384,816, filed on Aug. 27, 1999, now Pat. No. 6,801,538.

(51) Int. Cl.[7] .................................. H04I 12/413
(52) U.S. Cl. ................. 370/447; 370/445; 370/461
(58) Field of Search .................. 370/208, 209, 370/210, 310, 320, 326, 335, 336, 337, 342, 343, 345, 347, 431, 441, 442, 445, 446, 447, 448, 461, 462, 464, 478, 479, 480, 482, 498, 449

(56) References Cited

U.S. PATENT DOCUMENTS

| | | | |
|---|---|---|---|
| 4,940,974 A | 7/1990 | Sojka | 340/825.08 |
| 4,979,168 A | 12/1990 | Courtois et al. | 370/95.1 |
| 4,984,264 A | 1/1991 | Katsube | 379/197 |
| 5,010,329 A | 4/1991 | Nagakura | 340/825.08 |
| 5,303,234 A * | 4/1994 | Kou | 370/442 |
| 5,430,732 A | 7/1995 | Lee et al. | 370/95.1 |
| 5,499,243 A | 3/1996 | Hall | 370/85.8 |
| 5,615,212 A * | 3/1997 | Ruszczyk et al. | 370/433 |
| 5,648,958 A * | 7/1997 | Counterman | 370/458 |
| 5,719,868 A | 2/1998 | Young | 370/436 |
| 5,784,360 A | 7/1998 | I et al. | 370/252 |
| 5,793,307 A * | 8/1998 | Perreault et al. | 340/825.5 |
| 5,870,388 A | 2/1999 | Yung et al. | 370/260 |
| 5,892,769 A | 4/1999 | Lee | 370/447 |
| 5,960,000 A * | 9/1999 | Ruszczyk et al. | 370/447 |
| 6,084,955 A | 7/2000 | Key et al. | 379/220 |
| 6,370,153 B1 | 4/2002 | Eng | 359/110 |
| 6,408,165 B1 | 6/2002 | Raissinia et al. | 370/401 |
| 6,418,136 B1 | 7/2002 | Naor et al. | 370/347 |

FOREIGN PATENT DOCUMENTS

| | | | |
|---|---|---|---|
| WO | WO 97/10655 | 3/1997 | H04J/3/17 |
| WO | WO 97/39556 | 10/1997 | H04L/12/64 |

* cited by examiner

*Primary Examiner*—Dang Ton
*Assistant Examiner*—Phuc Tran
(74) *Attorney, Agent, or Firm*—Mayer Fortkort & Williams, PC; Heather L. Mansfield; Karin L. Williams, Esq.

(57) ABSTRACT

A technique for controlling outliers in offered load estimation in a shared medium communication network is achieved by partitioning the set of all possible sample value combinations, according to some predetermined partitioning scheme, based on a measure of proximity to a locus of expected sample values into a set of "trusted" sample value combinations and "untrusted" sample value combinations.

4 Claims, 4 Drawing Sheets

METHOD AND DEVICE FOR CONTROLLING OUTLIERS IN OFFERED LOAD ESTIMATION IN A SHARED MEDIUM COMMUNICATION NETWORK

CROSS REFERENCE TO RELATED APPLICATIONS

This application is a continuation of U.S. patent application Ser. No. 09/384,816, filed Aug. 27, 1999, now U.S. Pat. No. 6,801,538, entitled "Method And Device For Controlling Outliers In Offered Load Estimation In a Shared Medium Communication Network."

BACKGROUND OF THE INVENTION

1. Field of the Invention

The invention relates generally to communication systems, and more particularly to controlling outliers in offered load estimation in a shared medium communication network.

2. Discussion of Related Art

In today's information age, there is an increasing need for high-speed communication networks that provide Internet access and other on-line services for an ever-increasing number of communications consumers. To that end, communications networks and technologies are evolving to meet current and future demands. Specifically, new networks are being deployed which reach a larger number of end users, and protocols are being developed to utilize the added bandwidth of these networks efficiently.

One technology that has been widely employed and will remain important in the foreseeable future is the shared medium communication network. A shared medium communication network is one in which a single communications channel (the shared channel) is shared by a number of users such that uncoordinated transmissions from different users may interfere with one another. The shared medium communication network typically includes a number of secondary stations that transmit on the shared channel, and a single primary station situated at a common receiving end of the shared channel for, among other things, coordinating access by the secondary stations to the shared channel. Since communication networks typically have a limited number of communication channels, the shared medium communication network allows many users to gain access to the network over a single communication channel, thereby allowing the remaining communication channels to be used for other purposes.

Many techniques are known, which the primary station can use for coordinating access by the secondary stations to the shared channel. The ability of the primary station to meet specified performance goals depends on a number of factors, including the particular technique(s) employed and the number of secondary stations attempting to access the shared channel at any given time. (The rate at which secondary stations are attempting to access the shared channel at a specific time is often referred to as the "offered load" at this specific time). Furthermore, the ability of the primary station to meet specified performance goals often depends on the ability of the primary station to adapt to changes in the offered load over time, and more specifically on how quickly the primary station can adapt to such changes. Thus, the primary station must be able to estimate the offered load of the network and react accordingly.

Protocols that are employed to coordinate access to the shared channel are often referred to as Medium Access Control (MAC) protocols. MAC protocols fall into two basic categories: contention-free and contention-based protocols. In contention-free protocols, end users access a shared channel in a controlled manner such that transmissions are scheduled either statically or adaptively so that collisions are completely avoided. In contention-based protocols, users contend with one another to access channel resources. Collisions are not avoided by design, but are either controlled by requiring retransmissions to be randomly delayed, or resolved using a variety of other contention resolution strategies.

An example of a contention-based MAC protocol is known as an ALOHA protocol. Its original version, which operates with continuous or unslotted time, is referred to as Unslotted ALOHA. Another version, which operates with discrete or slotted time, is referred to as Slotted ALOHA. The behavior and performance of Unslotted and Slotted ALOHA have been studied widely, and their maximum throughputs are well known to be $1/(2e)$ and $1/e$, respectively.

Most contention-based protocols, including the ALOHA protocols, resolve collisions by using feedback information on the number of users involved in the collisions. If the number of conflicting transmissions can be determined from the feedback, then channel throughput arbitrarily close to one packet per packet transmission time is known to be achievable in principle, but with intractable complexity. More often than not, for the sake of simplicity, feedback information used is ternary indicating zero, one, or more transmissions, or binary indicating exactly one transmission or otherwise.

A shared channel is typically slotted in time, wherein a slotted ALOHA protocol or any other MAC protocols operating with slotted time can be employed for coordinating channel access. Many variations and extensions have been derived from the original slotted ALOHA protocol. In this protocol, and most of its derivatives, provided the probability of a new transmission and that of a retransmission in each slot are small, the throughput in a slot can be approximated by $G(n) \exp\{-G(n)\}$, where $G(n)$ is the offered load or attempt rate, which is a function of n that denotes the number of backlogged users at the beginning of a given slot. It follows that the maximum throughput of slotted ALOHA is $1/e=0.368$, which is attained when $G(n)=1$. It is well known that ordinary slotted ALOHA is generally not stable. Various methods for stabilizing slotted ALOHA exist, and many of them resort to adaptive control of the backoff scheme based on one or more states of the contention process. When the actual values of these states are not observable, they are estimated by a variety of means.

The stability of slotted ALOHA can be controlled by means of a dynamic frame structure, based on an a-posteriori expected value of the backlog at the beginning of each frame. Rivest in "Network Control by Bayesian Broadcast," published in the technical report at MIT/LCS/TM-287, MIT Lab. for Computer Science, 1985, proposed a Pseudo-Bayesian algorithm to maintain the attempt rate $G(n)$ close to 1 by estimating the number, n, of backlogged users at the beginning of each slot. A minimum mean-squared error predictor for estimating the channel backlog in slotted ALOHA was proposed by Thomopoulos, in "A Simple and Versatile Decentralized Control for Slotted ALOHA, Reservation ALOHA, and Local Area Networks," published in the IEEE Trans. on Communications, Vol. 36, No. 6, June 1988, for regulating the retransmission probability according to a recursive function of the channel backlog estimate.

The co-pending U.S. patent application Ser. No. 09/085, 749 entitled OFFERED LOAD ESTIMATION AND APPLICATIONS FOR USING SAME IN A COMMUNICATION NETWORK by Firass Abi-Nassif and Whay Chiou Lee, filed on May 28, 1998, describes a method for estimating the offered load on the upstream of an HFC (Hybrid Fiber Coaxial) cable. The estimate is susceptible to degradation due to outliers. A need remains for enhancing the performance of the offered load estimator.

Parameter estimators, in general, make use of measured sample observations to determine the values of the parameters to be estimated. The presence of erroneous or misleading sample observations can lead to an unreliable estimation. Methods for identifying and handling sample observations are therefore essential in many estimation problems.

As defined in "Outliers in Statistical Data", $3^{rd}$ Edition, Wiley 1994, by V. Barnett and T. Lewis, an observation in a set of data is considered an outlier if it appears to be inconsistent with the remainder of that set of data. Consider a univariate random sample of n observations originating from a distribution F. Suppose that they are ordered such that $x(1)<x(2)<\ldots<x(n)$. Observations close to, and including $x(1)$ and $x(n)$, are referred to as extremes. An observation that originates from another distribution H, but not from F, is referred to as a contaminant. There exist statistical methods, named discordancy tests, which can be used to examine an outlier as a potential contaminant, or to determine if an observation is statistically dubious in relation to a given distribution of observations.

In multivariate samples, a simple ordering of the multivariate observations in an increasing/decreasing order is inapplicable. One alternative, referred to as "reduced sub-ordering", is to identify a scalar metric that characterizes the "extremeness" of observations. For example, when the underlying sample distribution is a normal distribution, one could use a quadratic distance measure.

Three ways to handle outliers after assessing that they are discordant are presented by V. Barnett, in "Outliers and Order Statistics", published in Communications Statistics-Theory, 1988. 17 (7), 2109–2118. The first, referred to as "incorporation", consists of altering the underlying distribution F so that no observation vector appears to be discordant. The second method, referred to as "identification", uses a discordant outlier to discover a new important characteristic of the corresponding population. The third method, referred to as "rejection", is to simply reject the observation vector. This rejection method should be utilized when the knowledge of the underlying distribution is very accurate and "inviolable".

In many complex systems, it is often desirable to infer system state information based on a limited number of observations in the system. Specifically, a number of sample observations are made in order to obtain a number of sample values. The number of sample values represents a sample value combination from among a set of possible sample value combinations. Unfortunately, when only a limited number of observations are made, the inferred system state information may or may not be an accurate representation of the true state of the system. In the co-pending U.S. patent application Ser. No. 09/085,749 entitled OFFERED LOAD ESTIMATION AND APPLICATIONS FOR USING SAME IN A COMMUNICATION NETWORK, offered load estimates are susceptible to degradation due to outliers. Therefore, a need remains for a method and a device for controlling outliers in offered load estimation in a shared medium communication network.

SUMMARY OF THE INVENTION

In the preferred embodiment of the present invention, a method and device for outlier control of contention outcomes in a shared medium communication network is described which includes collecting a set of sample values being formed using contention outcomes of a plurality of contention intervals and partitioning the set of sample values according to a predetermined scheme the scheme being based on a measure of proximity to a locus of expected sample values, into a set of trusted sample values and a set of untrusted sample values. The untrusted sample values are rejected and the trusted sample values are accepted.

BRIEF DESCRIPTION OF THE DRAWINGS

The above-mentioned and other features of the invention will now become more apparent by reference to the following description taken in connection with the accompanying drawings in which.

DETAILED DESCRIPTION OF THE PREFERRED EMBODIMENT

As discussed above, a need remains for a method and a device for controlling outliers in offered load estimation in a shared medium communication network. The present invention provides a technique for outlier control that partitions the set of all possible sample value combinations into a set of trusted sample value combinations and a set of untrusted sample value combinations according to some predetermined partitioning scheme. Henceforth, "untrusted", "unreliable" and "improbable" will be used interchangeably. It should also be noted that the terms "sample value" and "observation point" will be used interchangeably. Various exemplary partitioning schemes are described. If a particular sample value combination falls within the set of trusted sample value combinations, then it is deemed to have a relatively high confidence level. On the other hand, if the sample value combination falls within the set of untrusted sample value combinations, then it is deemed to have a relatively low confidence level.

Figure 1:
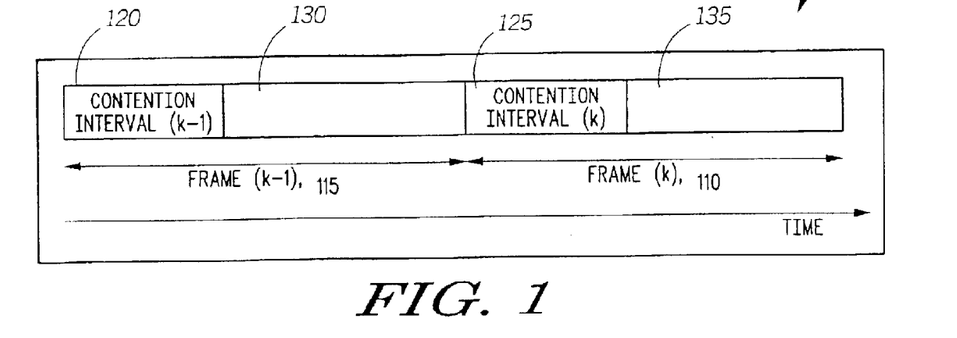
FIG. 1 is a time line depicting a shared channel in accordance with a preferred embodiment of the present invention, with the shared channel divided into successive frames including a contention interval for providing contention access.

Referring now to FIG. 1, in accordance with one aspect of the present invention, a shared channel time line is shown where a partition of the shared channel 100 is divided into discrete time slots, and is often referred to as a "slotted channel." The slotted channel 100 is organized into successive Frames 110, 115, etc. (as shown) where each Frame consists of a number of contiguous slots. The number of slots (not shown) in each frame, can be fixed or variable. In the preferred embodiment, k represents the index of the $k^{th}$ frame on the shared channel time line. Henceforth, "Frame k" 110 denotes the Frame whose index is k and "Frame k−1" 115 denotes the Frame whose index is k−1.

In the preferred embodiment, $T_k$ represents the number of slots in Frame k 110. A portion of each frame, referred to as the "contention interval k−1" and "contention interval k" 120, 125, respectively, is used for transmitting requests for contention access, and particularly for placing reservations of bandwidth for subsequent contention-free data transmission 130, 135. Henceforth, "contention interval k" 125 denotes the contention interval residing in "Frame k" 110. The number of slots in each contention interval 120,125 can be fixed or variable. In the preferred embodiment, $M_k$ represents the number of slots in the contention interval k, 125. It should be noted that $(T_k-M_k)$ slots in Frame k 110 are used for contention-free transmission of data upon successful reservation. According to the present invention, assuming that R slots are needed to transmit a request, the contention interval k, 125 therefore provides $M_k/R$ contention opportunities in which requests can be transmitted. Although $M_k$ is typically selected such that $M_k/R$ is an integer, $N_k$, there is no requirement that $M_k$ be so selected, and the value $M_k/R$ is heuristically treated as being a real number for the purpose of simplified analysis. When $M_k/R$ is not an integer, the value of $N_k$ is set to an integer value that is nearest to and smaller than $M_k/R$.

It is to be noted that while the description of the present invention is limited to a slotted shared medium network that utilizes a contention-based reservation scheme for coordinating contention-free data transmission, wherein each transmission frame is divided into a contention interval and a data interval, as discussed above in conjunction with FIG. 1, it is straightforward for a person skilled in the art to apply the invention to a slotted shared medium network that supports contention-based multiple access, wherein each transmission frame is entirely utilized for data contention.

In one preferred embodiment of the invention, each contention opportunity in a contention interval, such as contention interval k, 125, will result in one of the following contention outcomes: (1) no request transmission; (2) a single request transmission; and (3) multiple request transmissions. When a single request is transmitted in a contention opportunity, the request is considered successful. When multiple requests are transmitted, it is presumed that the requests collide, and are therefore unsuccessful. Therefore, according to the present invention, the three contention outcomes are referred to as IDLE, SUCCESS, and COLLISION, respectively.

It should be noted that certain combinations of contention outcomes are more probable than others. For example, it is unlikely (but possible) that there would be all SUCCESS outcomes in a contention interval with no IDLE or COLLISION outcomes. It is also unlikely (but possible) that there would be an equal number of IDLE and COLLISION outcomes with no SUCCESS outcomes in a contention interval. Thus, according to the preferred embodiment of the present invention, the set of all possible combinations of contention outcomes in a contention interval can be divided into two sets: those combinations of contention outcomes that are likely and therefore "trusted", and those that are unlikely and therefore "untrusted". If an outcome falls within the set of "trusted" combinations of contention outcomes, then it is used to update the estimated offered load. Otherwise, it can be discounted or completely ignored for the purpose of updating the estimated offered load.

Hence, the present invention provides a method and device for defining the sets of "trusted" and "untrusted" combinations of contention outcomes.

Figure 2:
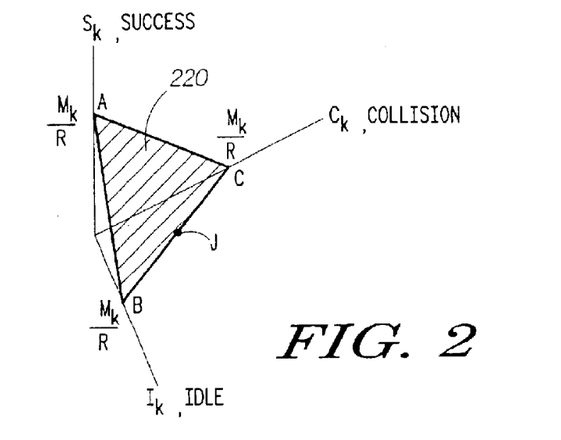
FIG. 2 is a three-dimensional graph depicting a planar region ABC representing the set of possible contention outcomes in accordance with a preferred embodiment of the present invention.

Referring now to FIG. 2, in accordance with the present invention, $I_k$, $S_k$, and $C_k$ respectively denote the number of IDLE, SUCCESS and COLLISION outcomes in frame k 110 of FIG. 1. A combination of contention outcomes in a Frame k 110 is referred to by a triplet $(I_k, S_k, C_k)$. An observation point with coordinates specified by the triplet $(I_k, S_k, C_k)$ can be obtained according to an underlying stochastic process that generates transmission attempts with a rate $G_k$ that is to be estimated. By assuming that the contention message arrival process is a Poisson process, the rate $G_k$ is the only parameter needed to completely characterize that process. Note that the system is gated in the sense that all requests associated with an offered load in a frame must wait at least until the beginning of the next frame before they are allowed to be transmitted. In this respect, rate $G_k$ is the effective offered load in the contention interval of Frame k 110 due to the offered load in Frame k−1, 115. Henceforth, $G_k$ will be interchangeably referred to as rate $G_k$ and effective offered load $G_k$.

Since a contention outcome can only be an IDLE, SUCCESS or COLLISION, the following equation is necessarily satisfied:

$$I_k+S_k+C_k=N_k, \qquad \text{Eq. 1}$$

with, $I_k \geq 0$, $S_k \geq 0$ and $C_k \geq 0$.

Eq. 1 defines a two-dimensional (2-D) Plane P 220 as shown in shaded section in FIG. 2 in a three-dimensional (3-D) coordinate system with the three axes representing '$I_k$', '$S_k$' and '$C_k$'.

FIG. 2 depicts the 3-D coordinate system along with Plane P 220. Note that Plane P 220 contains all the possible contention outcomes of a request contention interval in Frame k 110. In other words, any observation point $(I_k, S_k, C_k)$ falls inside Plane P 220.

Figure 3:
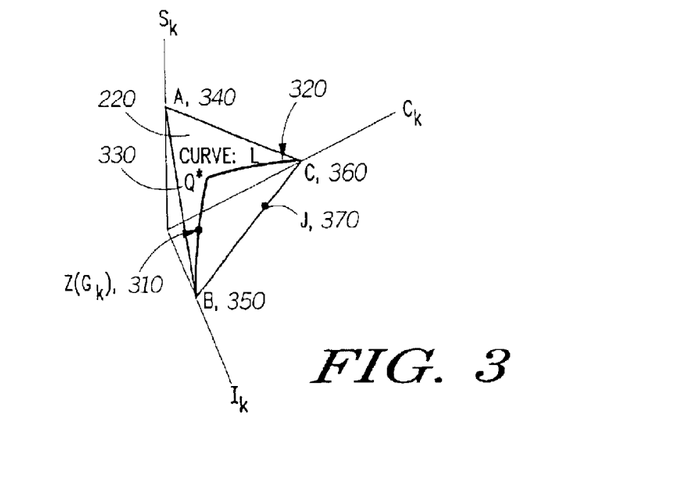
FIG. 3 is a three-dimensional graph showing the locus of expected outcomes within the planar region ABC in accordance with a preferred embodiment of the present invention.

Referring to FIG. 3, $Z(G_k)$ 310 denotes an expected observation point, which is determined by the rate $G_k$ under the Poisson assumption. The associated coordinates $(E^I(G_k), E^S(G_k), E^C(G_k))$ are given by:

$$E^I(G_k)=\exp(-G_k)\times N_k$$

$$E^S(G_k)=G_k\times\exp(-G_k)\times N_k$$

$$E^C(G_k)=[1-\exp(-G_k)-G_k\times\exp(-G_k)]\times N_k$$

wherein $E^I(G_k)$, $E^S(G_k)$, $E^C(G_k)$, respectively denote the expected numbers of IDLE, SUCCESS and COLLISION contention outcomes.

Since the expected observation point satisfies Eq. 1 or $E^I(G_k)+E^S(G_k)+E^C(G_k)=N_k$, it falls inside the Plane P 220 containing all possible observation points.

The credibility of an observation point can be tested based on its proximity to the expected point $Z(G_k)$ 310. It should be noted that Curve L 320, as depicted in FIG. 3, describes a locus of $Z(G_k)$ 310, for $G_k$ ranging from zero to infinity. In accordance with the Poisson arrival process model, every observation point on L 320 corresponds to a unique value of $G_k$.

Since the maximum probability of SUCCESS that can be achieved given the Poisson arrival process model, is equal to $1/e \cong 0.368$, the maximum expected number of SUCCESSes $E^S(G_k)$, out of $N_k$, is approximately equal to $0.368 \times N_k$. This maximum is achieved for $G_k = 1$. The corresponding point 330, $Q^* \equiv Z(1) = (0.368 \times N_k, 0.368 \times N_k, 0.264 \times N_k)$ is shown in FIG. 3.

In accordance with the present invention, in order to better understand how Curve L 320 can be utilized in testing the credibility of an observation point, given that the underlying arrival process is Poisson, it is first assumed that the associated rate $G_k$ is known. It will be recognized that the rate is unknown.

If the rate (i.e., effective offered load) is indeed $G_k$ (known), and an infinite number of samples (i.e. $N_k \to \infty$) are considered, it is expected that, by the law of large numbers, the observation point inside Plane P 220 of FIG. 2 coincides with the expected observation point $Z(G_k)$ 310 on Curve L 320. Thus, the observation point asymptotically matches the a-priori knowledge of the arrival process (i.e. Poisson with rate $G_k$). When $N_k$ is sufficiently small, and hence the law of large numbers does not hold true, such asymptotic matching is very unlikely.

Observation points which do not coincide with the expected observation point $Z(G_k)$ 310, occur with a probability that is dependent on the position of the observation point in Plane P 220. In fact, it is expected that points which do not closely match the a-priori knowledge would occur with low probability and would be considered unreliable.

What is assumed known a-priori is that the underlying arrival process is Poisson, but that the true rate $G_k$ is not known. However, if for any value of $G_k \geq 0$, the observation point poorly matches the a-priori knowledge, the observation point is considered improbable. An observation point is considered improbable if there exists no $G_k$ such that the point matches well the a-priori knowledge about the underlying Poisson arrival process.

For instance, the observation point A 340 in FIG. 3 corresponds to observing SUCCESSes in all the contention opportunities within Frame k 110. Obtaining total SUCCESSES is not impossible, but rather unusual because, for any value of the effective offered load $G_k$, it does not agree with the a-priori knowledge. As another example, the observation point J 370 in FIG. 3 corresponds to obtaining many COLLISIONs and many IDLES in the contention interval of Frame k 110. It is also rather unusual to observe many IDLEs and many COLLISIONs at the same time, with no SUCCESSes at all, for any value of the effective offered load $G_k$. Therefore, if for any value of the effective offered load $G_k$, a point has a low probability of occurrence, it can be practically be considered as unreliable.

Using the probability of occurrence as a measure for the credibility of the observation point is fairly computationally involved. For this reason, an alternative measure of how well the observation point matches the a-priori knowledge of the expected outcomes represented by Curve L 320, is utilized based on the Euclidian distance from the observation point to Curve L 320. According to this measurement, it is expected that points that are far (in terms of Euclidian distance) from Curve L 320, have a low probability of occurrence for any value of $G_k \geq 0$.

Assume that the actual effective offered load in Frame k 110 of FIG. 1 is known to be $G_k$. Considering the observation point, $(I_k, S_k, C_k)$, as determined by the statistics collected during Frame k 110, it would not necessarily coincide with point $Z(G_k)$ 310. By letting $d_I$, $d_S$ and $d_C$ be the disturbances of the coordinates of the observation point with respect to the coordinates of the point $Z(G_k)$ 310, that is, $$d_I = I_k - E^I(G_k); \quad d_S = S_k - E^S(G_k); \quad d_C = C_k - E^C(G_k),$$

it follows that:

$$I_k = E^I(G_k) + d_I = \exp(-G_k) + d_I$$

$$S_k = E^S(G_k) + d_S = G_k \exp(-G_k) + d_S$$

$$C_k = E^C(G_k) + d_C = [1 - \exp(-G_k) - G_k \exp(-G_k)] + d_C$$

By definition, $d^2 = (d_I)^2 + (d_S)^2 + (d_C)^2$, is the squared Euclidian distance from the actual observation point to the expected observation point $Z(G_k)$ 310 that matches the a-priori knowledge about the arrival process. Clearly, the larger the Euclidian distance d, the greater the magnitude of the error introduced due to the finite number of samples, and thus, the poorer the matching between the observation point and the a-priori knowledge.

Consequently, it would be reasonable to set a threshold D and classify as unreliable, observation points whose Euclidian distance d exceeds D. Unfortunately, the Euclidian distance d is not determinable because the actual value of the effective offered load $G_k$ is not known. However, a lower bound $d_{min}$ 420 for d can be determined, $d_{min}$ 420, as shown in FIG. 4, being the minimum Euclidian distance from observation point to the Curve L 320.

Therefore, if $d_{min}$ 420 is greater than a certain threshold D, then no matter what the actual value of $G_k$ is, the Euclidian distance d from the observation point to point $Z(G_k)$ 310 would be greater than this threshold. Therefore, $d_{min}$ 420 can also be viewed as a measure of how well the observation point fits the a-priori knowledge. Hence, as $d_{min}$ 420 increases, the observation point fits less and less the a-priori knowledge, and if $d_{min}$ 420 exceeds some threshold D, the observation point is considered untrusted and will therefore not be used to update the value of the estimator.

Figure 4:
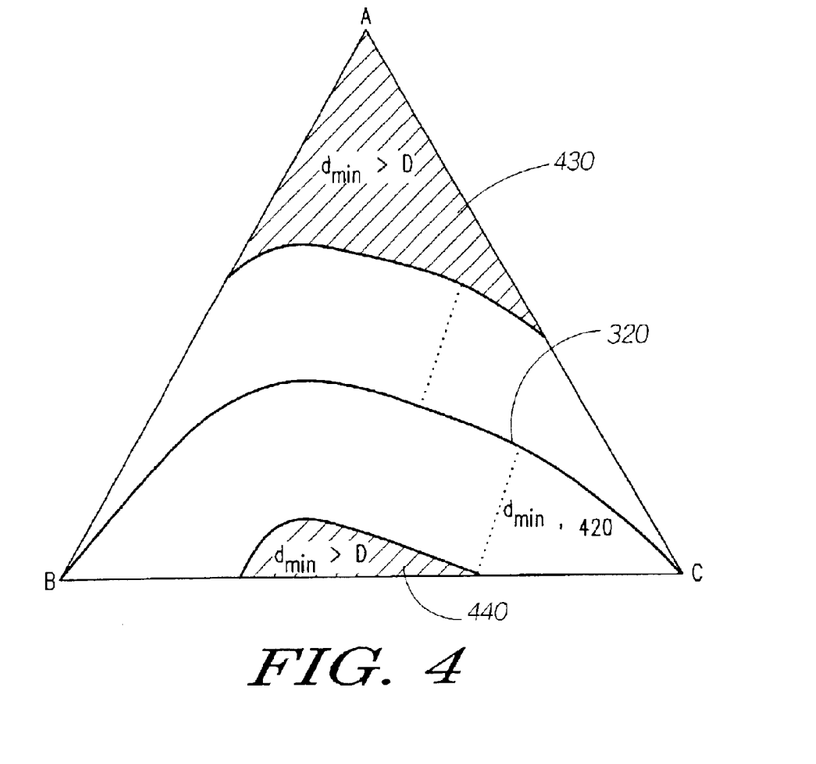
FIG. 4 is a two-dimensional graph showing the planar region ABC divided into three regions based on the distance of points from the locus of expected outcomes in accordance with a preferred embodiment of the present invention.

The shaded regions 430 and 440 in FIG. 4 depict the set of observation points whose $d_{min}$ 420 from L 320 exceeds threshold D and thus, would be rejected.

In order to determine whether an observation point falls in the shaded (rejection) regions 430 and 440, its minimum Euclidian distance from Curve L 320 needs to be calculated. This is a computationally involved problem. Hence, it is desirable to determine rejection regions which contain the observation points with a minimum Euclidian distance $d_{min}$ 420 from L 320 exceeding a certain threshold D, and such that testing if an observation point falls in these regions is straightforward. A goal of the present invention is to subdivide Plane P 220 into an acceptance region R1 where the Euclidian distance from the observation point to Curve L 320 is considered to be small and another rejection region R2 where the Euclidian distance from the observation point to Curve L 320 is considered to be large, while keeping the acceptance/rejection decision making simple.

In an attempt to identify acceptance/rejection regions that make the observations classification simple, consider the intersection of Plane P 220, with the following three planes, each of which is identified by a constant value of one of the coordinates associated with IDLE, SUCCESS, and COLLISION.

$$I_k = I_0; \quad S_k = S_0; \quad C_k = C_0$$

Figure 5:
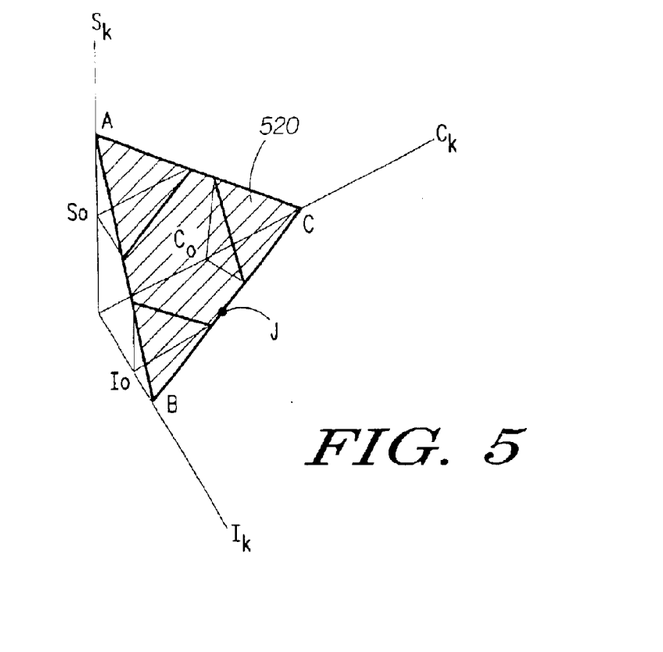
FIG. 5 is a three-dimensional graph showing the planar region ABC intersected with three planes $S_0$, $I_0$, and $C_0$ in accordance with the present invention.

The resulting graph is shown in FIG. 5. A corresponding 2-D view of Plane P 520 is depicted in FIG. 6 for a specific choice of $I_0 \cong 0.4 \times N_k$, $S_0 \cong 0.4 \times N_k$, and $C_0 \cong 0.3 \times N_k$.

Figure 6:
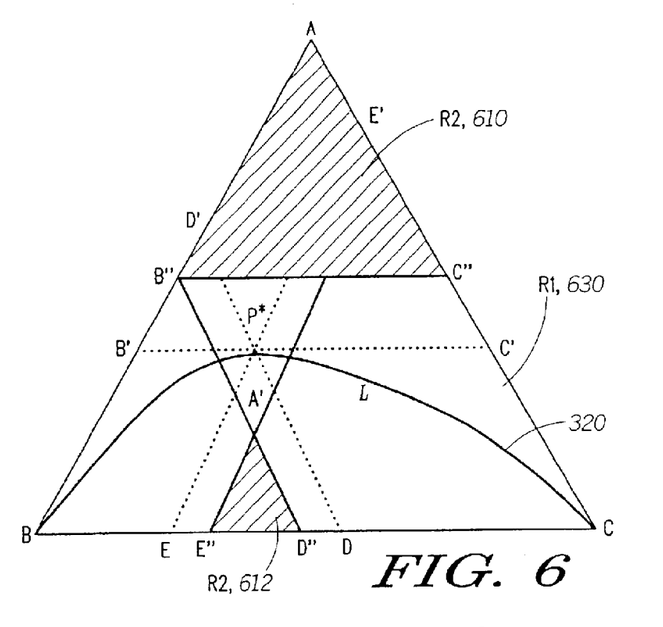
FIG. 6 is a two-dimensional graph showing the planar region ABC intersected with three planes $S_0$, $I_0$, and $C_0$, subdividing ABC into rejection regions and acceptance regions, in accordance with a preferred embodiment of the present invention.

The rejection region R2 is shown in FIG. 6 as the two shaded areas AB"C" 610 which corresponds to: $S_k > S_0$, and the shaded area A'E"D" 612 which corresponds to: $I_k > I_0$ and $C_k > C_0$. It should be noted that the rejection region R2, 610 and 612 need not be contiguous. By default, the acceptance region R1 630 is the remaining un-shaded portion within the Plane P 520.

Note that FIG. 6 suggests that these areas approximate fairly well the rejection regions 430 and 440 based on the Euclidian distance criterion shown in FIG. 4. Therefore, the un-shaded acceptance region R1 630 in FIG. 6 and the shaded rejection region R2 610 and 620 in FIG. 6 are determined as follows:

$$R2 \equiv (A'E"D" \cup AB"C") \text{ and } R1 \equiv (ABC \cap (R2)^C).$$

The following examples illustrate how observation points that fall in the shaded (rejection) regions, 610 and 612 in FIG. 6, have a low probability of occurrence for any value of $G_k$, and at the same time, have a relatively large Euclidian distance $d_{min}$ 420 from Curve L 320.

For instance, area A'E"D", $[I_k > I_0 \text{ and } C_k > C_0]$, 612 shown in FIG. 6, corresponds to obtaining many COLLISIONs and many IDLEs in the request contention interval within Frame k 110. This combination of contention outcomes is improbable whatever the value of the effective offered load is. Therefore, observation points that fall in this region match poorly the a-priori knowledge of the arrival process (for any value of the rate $G_k$). It should be noted that the Euclidian distance between Curve L 320 and observation points that fall in this area is relatively large.

Area AB"C", $[S_k > S_0]$, 610 corresponds to the case of many SUCCESSes, few COLLISIONs and few IDLEs, with a probability of SUCCESS higher than 0.368. Although this is usually a very desirable operating point, it is improbable. Therefore, observation points that fall in this region match poorly the a-priori knowledge (for any value of the rate $G_k$). It should be noted that the Euclidian distance between Curve L 320 and observation points that fall in this area is relatively large.

It should also be noted that although the description of the above embodiment of the present invention is limited to a contention-based system utilizing ternary feedback, it is straightforward for a person skilled in the art to extend the invention to apply to a contention-based system utilizing an n-array feedback, where $n \geq 2$.

In general, one can consider the following feedback state of the system in a Frame k 110 using the following feedback vector:

$$F_k = (F_k(0), F_k(1), F_k(2), \ldots, F_k(n-1))$$

where $F_k(j)$, for $j = 0, 1, 2, \ldots, n-2$, represents the number of contention slots in each of which exactly j users transmit, and $F_k(n-1)$ represents the number of contention slots in which at least n−1 users transmit. Given $N_k$ contention opportunities within Frame k 110, it is necessary that:

$$\sum_{j=0}^{n-1} F_k(j) = N_k$$

With the following mapping, this general framework degenerates to the system utilizing ternary feedback, whereby:

$$F_k(0) \rightarrow I_k$$

$$F_k(1) \rightarrow S_k$$

$$F_k(2) \rightarrow C_k$$

Outlier Control

Figure 7:
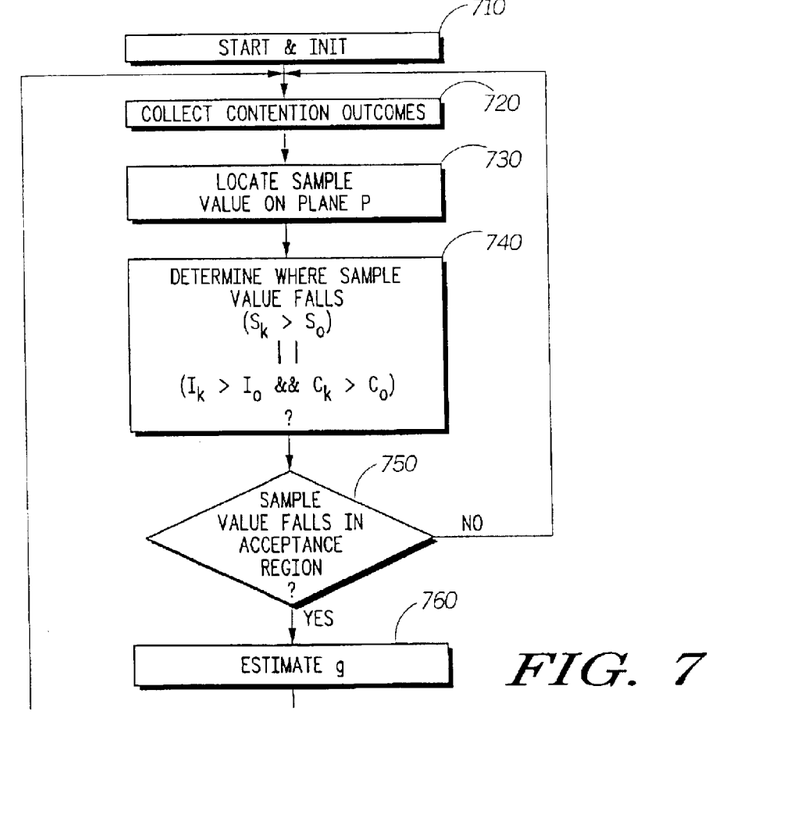
FIG. 7 depicts a flowchart of the method for controlling outliers in offered load estimation in a shared medium communication network.

The method for controlling outliers in offered load estimation is described by the flowchart in FIG. 7. Prior to the first contention interval, the system is at Step 710. As contention intervals pass on the shared channel time line 100 of FIG. 1, the system collects the contention outcomes of the contention opportunities (Step 720). At the end of each contention interval, the sample value, corresponding to the contention outcomes of the contention interval, is generated and located on Plane P 520 of FIG. 5 (Step 730). Then at Step 740, the system determines if the sample value falls in the un-shaded acceptance region R1 630 of FIG. 6. This determination is made based upon the number of IDLES exceeding the IDLE $I_0$ threshold and the number of COLLISIONS exceeding the COLLISION $C_0$ threshold or the number of SUCCESSES exceeding the SUCCESS $S_0$ threshold.

The following boolean expression defines the above determination:

$$(S_k > S_0) \| (I_k > I_0 \&\& C_k > C_0)$$

as depicted in Step 740.

At Step 750, if the above expression is true, the sample value falls within the acceptance region R1 630 of FIG. 6 and the sample value is used to estimate the offered load (Step 760). Subsequently, the system returns to Step 720 to re-start the process of collecting contention outcomes. If the sample value falls in the rejection region R2, shaded regions 610 and 612 in FIG. 6, the sample value is therefore not used to estimate the offered load and the system returns to Step 720 to re-start the process of collecting contention outcomes.

Some Applications Utilizing Estimated Offered Load with Outlier Control

The method of estimating offered load as shown in Step 760 of FIG. 7 in a communication network has many applications. One important application utilizes the estimated offered load to improve access performance in a shared medium communication network. Specifically, the estimated offered load is used for determining certain operating parameters such as the number of contention opportunities per frame and certain access mode parameters that affect how the network is accessed.

Figure 8:
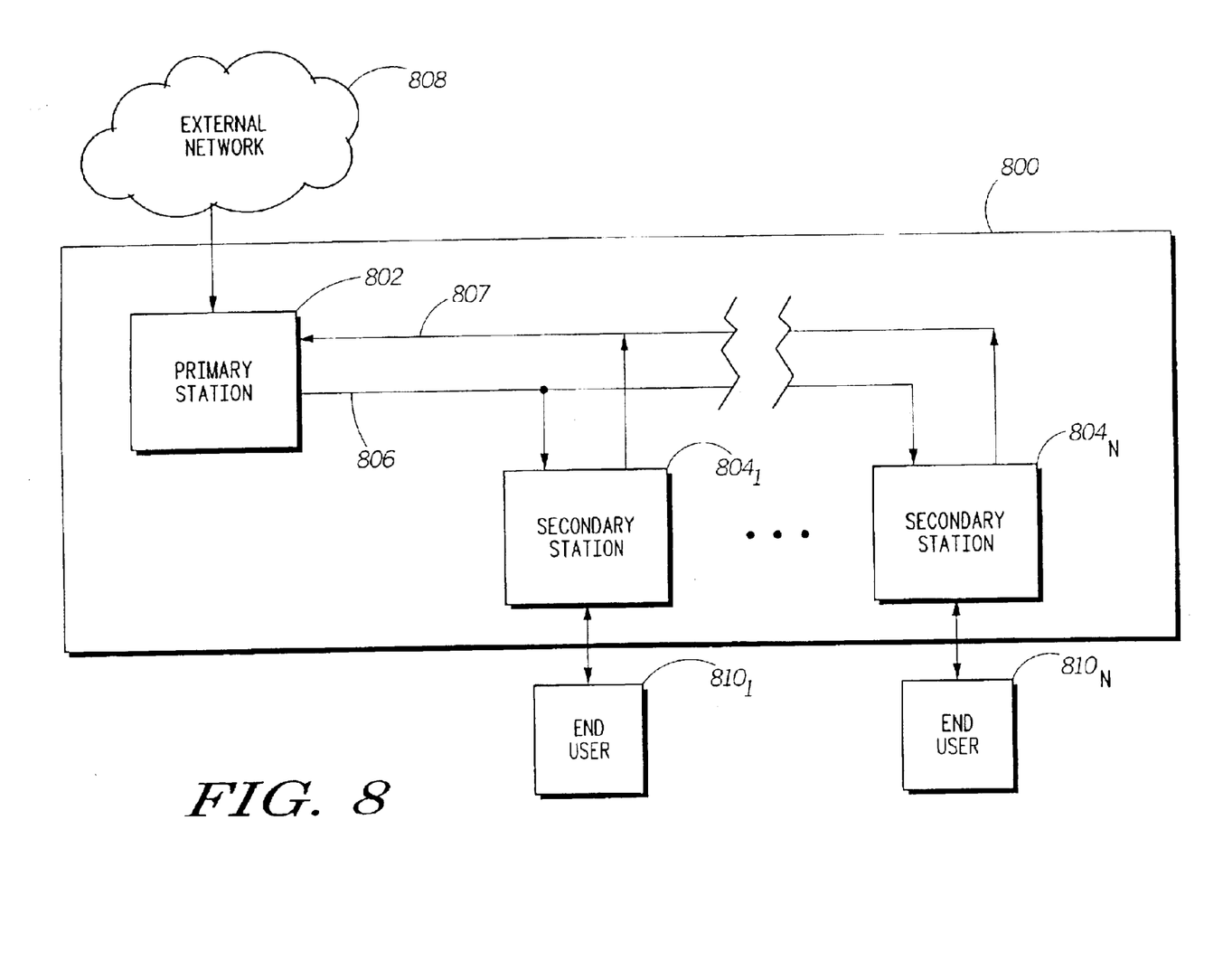
FIG. 8 is a block diagram showing a shared medium communication network in accordance with a preferred embodiment of the present invention.

FIG. 8 shows a generic shared medium communication network 800 in accordance with a preferred embodiment of the present invention. The shared medium communication network 800 allows a number of end users $810_1$ through $810_N$ to access a remote external network 808 such as the Internet. The shared medium communication network 800 acts as a conduit for transporting information between the end users 810 and the external network 808.

The shared medium communication network 800 includes a primary station 802 that is coupled to the external network 808. The preferred embodiment of the present invention described in the algorithm of FIG. 7 applies to an offered load estimator residing in the primary station 802. The primary station 802 is in communication with a plurality of secondary stations $804_1$ through $804_N$ (collectively referred to as "secondary stations 804" and individually as a "secondary station 804") by means of channels 806 and 807. Channel 806 carries information in a "downstream" direction from the primary station 802 to the secondary stations 804, and is hereinafter referred to as "downstream channel 806." Channel 807 carries information in an "upstream"

direction from the secondary stations 804 to the primary station 802, and is hereinafter referred to as "upstream channel 807. " Each end user 810 interfaces to the shared medium communication network 800 by means of a secondary station 804.

In an exemplary embodiment, the shared medium communication network 800 is a data-over-cable (DOC) communication system wherein the downstream channel 806 and the upstream channel 807 are separate channels carried over a shared physical medium. In the preferred embodiment, the shared physical medium is a hybrid fiber-optic and coaxial cable (HFC) network. The downstream channel 806 is one of a plurality of downstream channels carried over the HFC network. The upstream channel 807 is one of a plurality of upstream channels carried over the HFC network. In other embodiments, the shared physical medium may be coaxial cable, fiber-optic cable, twisted pair wires, and so on, and may also include air, atmosphere, or space for wireless and satellite communication. Also, the various upstream and downstream channels may be the same physical channel, for example, through time-division multiplexing/duplexing, or separate physical channels, for example, through frequency-division multiplexing/duplexing.

In the shared medium communication network 800 of the preferred embodiment, the downstream channels, including the downstream channel 806, are typically situated in a frequency band above approximately 50 MHz, although the particular frequency band may vary from system to system, and is often country-dependent. The downstream channels are classified as broadcast channels, since any information transmitted by the primary station 802 over a particular downstream channel, such as the downstream channel 806, reaches all of the secondary stations 804. Any of the secondary stations 804 that are tuned to receive on the particular downstream channel can receive the information.

In the shared medium communication network 800 of a preferred embodiment, the upstream channels, including the upstream channel 807, are typically situated in a frequency band between approximately 5 through 42 MHz, although the particular frequency band may vary from system to system, and is often country-dependent. The upstream channels are classified as shared channels, since only one secondary station 804 can successfully transmit on a particular upstream channel at any given time, and therefore the upstream channels must be shared among the plurality of secondary stations 804. If more than one of the secondary stations 804 simultaneously transmit on a particular upstream channel, such as the upstream channel 807, there is a COLLISION that corrupts the information from all of the simultaneously transmitting secondary stations 804.

In order to allow multiple secondary stations 804 to share a particular upstream channel, such as the upstream channel 807, the primary station 802 and the secondary stations 804 participate in a medium access control (MAC) protocol. The MAC protocol provides a set of rules and procedures for coordinating access by the secondary stations 804 to the shared upstream channel 807. Each secondary station 804 participates in the MAC protocol on behalf of its end users. For convenience, each participant in the MAC protocol is referred to as a "MAC User."

In one embodiment, the MAC protocol includes a protocol commonly referred to as Multimedia Cable Network System (MCNS), which is defined in the document entitled MCNS Data-Over-Cable Service Interface Specifications Radio Frequency Interface Specification SP-RFI-I02-971008 Interim Specification (hereinafter referred to as the "MCNS Protocol Specification"), incorporated herein by reference in its entirety. In the MCNS Protocol Specification, the primary station 802 is referred to as a Cable Modem Termination System (CMTS), and the secondary stations 804 are referred to as Cable Modems (CMs). The CMTS is responsible for packet processing, resource sharing, and management of the MCNS MAC and Physical layer functions. Each CM operates as a slave to the CMTS. MAC Protocol Data Units (PDUs) transmitted on the downstream channel 806 by the CMTS may be addressed to an individual CM via unicast, or to a selected group of CMs via multicast or broadcast. In the upstream channel, a MAC PDU may be sent by any CM to the CMTS. MCNS supports variable length MAC PDUs.

The MCNS Protocol Specification utilizes a slotted upstream channel, such that the upstream channel 807 is divided into successive time slots. The MAC protocol supports a plurality of slot types for carrying different types of information. Each time slot is capable of transporting a unit of information (for example, a data packet or a control packet). The MCNS Protocol Specification further divides the upstream channel 807 into successive frames, where each frame includes a number of slots. The CMTS allocates bandwidth to a group of CMs by transmitting on the downstream channel 806 a control message containing a bandwidth allocation information element known as a MAP. The MAP specifies the allocation of transmission opportunities within a given transmission frame. Bandwidth is allocated, frame by frame, in terms of transmission opportunities for contention-based reservation requests (or simply requests) as well as for user data. A successful transmission in a contention opportunity results in the reservation of a future data transmission opportunity.

More specifically, the upstream channel 807 is modeled as a stream of mini-slots, providing for TDMA at regulated time ticks. The use of mini-slots implies strict timing synchronization between the CMTS and all the CMs. Hence, the CMTS is responsible for generating the time reference to identify these mini-slots and periodically allow for ranging opportunities so that all CMs maintain their synchronization. The access to the mini-slots by the CMs is controlled by the CMTS. To accomplish that, the CMTS transmits on the downstream channel a MAP describing the use of each upstream mini-slot in a specified future time interval. This message, in a way, "maps" in a future time interval each mini-slot to its use. Of course, the MAP has to be sent by the CMTS earlier than the effective time interval that it describes in order to allow enough time for the CMs to transmit in the mapped mini-slots.

In the MCNS Protocol Specification, each frame is organized into discrete intervals. At least three different interval types are defined. A contention interval includes a number of mini-slots that are allocated for transmitting requests (or small data packets) in contention mode. A maintenance interval includes a number of mini-slots allocated for registration of CMs. A data grant interval includes a number of mini-slots allocated for transmitting data packets. The MAP includes a number of information elements (IEs) that define the different intervals in the frame.

An important consideration that affects performance in the MCNS MAC protocol is the number of mini-slots allocated to the contention interval in each frame. The number of mini-slots allocated to the contention interval affects the number of mini-slots allocated to the other intervals, particularly the data interval. A large number of mini-slots allocated to the contention interval decreases the likelihood of COLLISIONs, but also decreases the number of mini-slots allocated for transmitting data and therefore decreases the data throughput of the system. Furthermore, a small number of mini-slots allocated to the contention interval can increase the likelihood of COLLISIONs and therefore decrease the data throughput of the system by preventing successful requests from reaching the CMTS. In an exemplary embodiment, the number of slots in the contention interval is selected to maximize the likelihood of SUCCESS outcomes. This typically involves increasing the number of slots in the contention interval if the offered load is high, and decreasing the number of slots in the contention interval if the offered load is low. Thus, the offered load is a key consideration in selecting the number of slots per contention interval.

Another important consideration that affects performance in the MCNS MAC protocol is the type of contention access used. In accordance with the MCNS Protocol Specification, at least two types of contention access is supported. In a first type of contention access, the secondary stations 804 are only permitted to transmit request messages during the contention interval. In a second type of contention access, the secondary stations 804 are permitted to transmit either request messages or small data messages during the contention interval. The second type of contention access can improve performance when there are few COLLISIONs, but can decrease performance when there are many COLLISIONs. Therefore, the second type of contention access would only be utilized when the actual offered load is low, where the first type of contention access would be used when the actual offered load is high. Thus, the offered load is a key consideration in selecting the type of contention access in the MCNS MAC protocol.

It should be noted that this invention might be embodied in software, firmware and/or hardware. The software and/or firmware might be stored on a computer usable medium, such as a computer disk or memory chip.

While the invention has been described in conjunction with a specific embodiment thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A method for estimating an offered load of a shared communication channel in a communication network using a contention-based protocol, the shared channel transmitting a continuous stream of frames, each of the frames having a request interval, the request interval comprising a plurality of request transmission opportunities and usable by a plurality of users to transmit request messages, the request messages used to request access to the shared channel via the contention-based protocol, the method comprising:

forming a contention outcome based on whether a user transmitted a request message in a request transmission opportunity, the contention outcome being an n-array outcome associated with each request transmission opportunity and based on a number of users in the shared medium communication network transmitting request messages in each request transmission opportunity within a predetermined contention interval, said number of users being of:
zero;
exactly one;
exactly k, for k=2, . . . , n−2; and
n−1 or more;

collecting samples of contention outcomes from request transmission opportunities in a plurality of request intervals;

forming a set of valid contention outcomes by applying a method of outlier control to the samples of contention outcomes; and estimating an offered load based on the set of valid contention outcomes.

2. The method according to claim 1, further comprising: using the estimated offered load to establish a value of an operating parameter of the communication network.

3. The method according to claim 2, wherein the operating parameter comprises a number of request transmission opportunities in each request interval.

4. The method according to claim 3, wherein the n-array contention outcome is based on n=3, and the contention outcome associated with a request transmission opportunity comprises one of:

IDLE, if no request message was transmitted in the request transmission opportunity;

SUCCESS, if a single request message was transmitted in the request transmission opportunity; and COLLISION, if multiple request messages were transmitted in the request transmission opportunity.

* * * * *